United States Patent Office

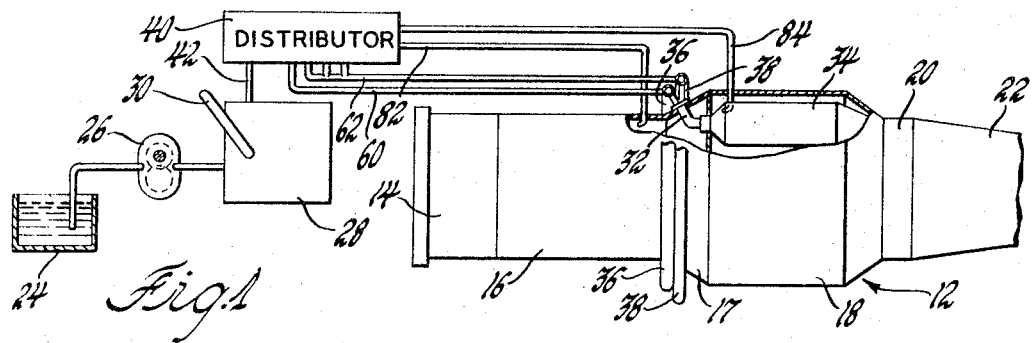
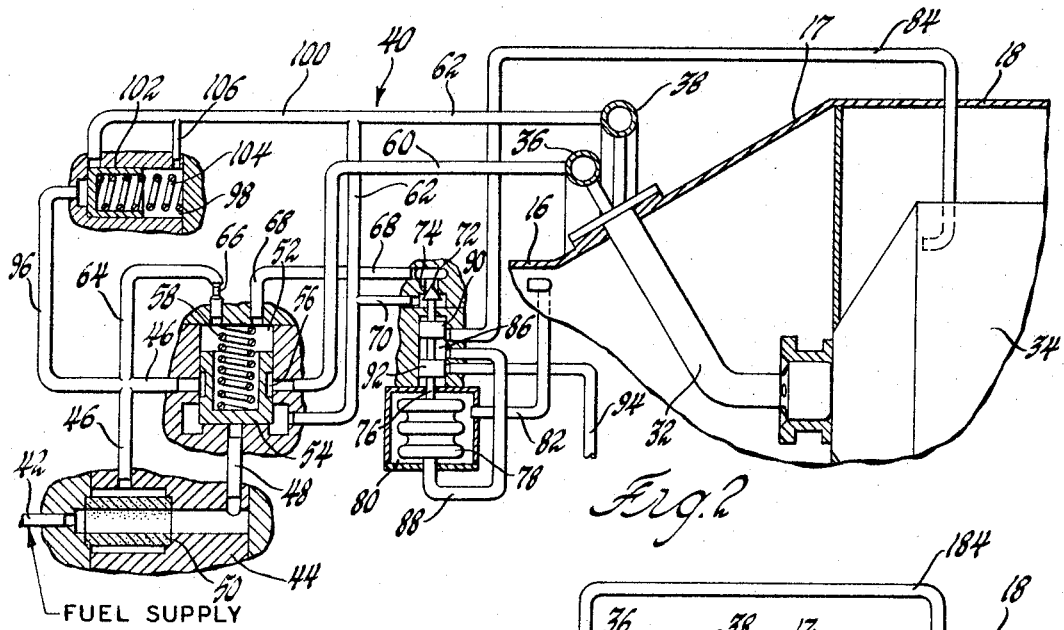
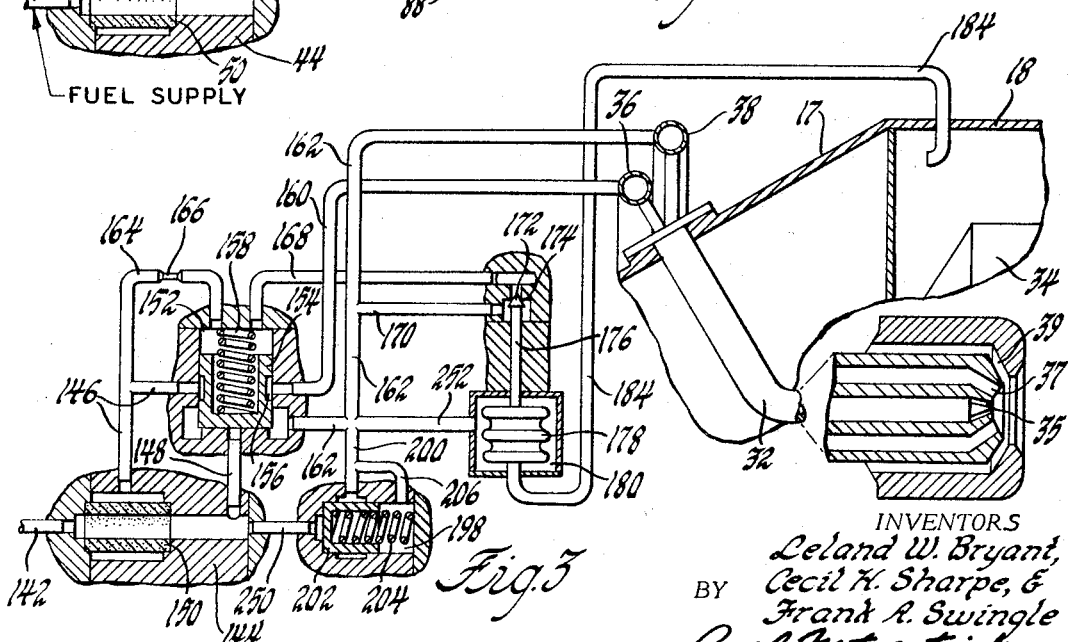
INVENTORS
Leland W. Bryant,
Cecil H. Sharpe, &
Frank R. Swingle
BY Paul Fitzpatrick
ATTORNEY

3,319,418
Patented May 16, 1967

3,319,418
FUEL DISTRIBUTION SYSTEM FOR MULTIPLE BURNERS IN A GAS TURBINE ENGINE
Leland W. Bryant, Indianapolis, Cecil H. Sharpe, Brownsburg, and Frank A. Swingle, Indianapolis, Ind., assignors to General Motors Corporation, Detroit, Mich., a corporation of Delaware
Filed Oct. 20, 1965, Ser. No. 498,524
10 Claims. (Cl. 60—39.28)

Our invention relates to fuel systems of gas turbine engines and the like. It is particularly directed to means for apportioning or distributing fuel between the small flow and large flow ports of a duplex fuel nozzle or a set of such nozzles.

Gas turbine engines burning liquid fuel are generally provided with a number of fuel spray nozzles to diffuse the fuel in the combustion chamber where it is burned. In most installations, and particularly in those for aircraft, the rate of fuel flow varies over a wide range. For this reason, it is common to use dual or duplex fuel nozzles which depend upon swirling the fuel for atomization. They have small swirl ports to achieve high swirl velocities at low fuel flows and larger ports to provide the necessary capacity for high flows. The large ports must be shut off so as to direct the flow through the small ports until the rate of fuel supply becomes sufficiently large to require that the large ports begin to open. These nozzles then are connected to a fuel source through a distributing valve which may be provided individually for each nozzle, or collectively for a set of nozzles by connecting the nozzles to primary and secondary manifolds with a single valve to divide flow between these manifolds.

Our invention is directed to a fuel distribution system which preferably includes a single valve to divide flow between manifolds which supply large and small flow ports in a group of nozzles. However, such a valve may be provided individually for each nozzle. It embodies means for simultaneously opening a secondary system to the large flow or secondary nozzle ports while closing a primary or low flow system. It includes means for finely filtering the fuel directed into the primary system and for washing the filter with secondary flow and disposing of the sediment through the secondary ports.

The nature of our invention will be clear to those skilled in the art from the accompanying drawings of preferred embodiments thereof in conjunction with the succeeding detailed description wherein:

FIGURE 1 is a schematic view of a fuel distribution system in accordance with our invention showing the relationship of the various parts of the fuel system to a fuel control and a gas turbine engine with which it is utilized.

FIGURE 2 is a detailed schematic view of the fuel distribution system in accordance with our invention and a portion of the gas turbine engine shown in FIGURE 1.

FIGURE 3 is a detailed schematic of an alternate embodiment of a fuel distribution system in accordance with our invention.

Referring to FIGURE 1, there is shown a gas turbine engine 12 comprising an inlet zone 14, compression zone 16, diffusion zone 17, combustion zone 18, turbine zone 20, and exhaust zone 22. The gas turbine engine 12 may be of the type which has a regenerative zone in lieu of or in addition to the diffusion zone 17. A fuel supply 24 is connected to a pump 26 to supply fuel under pressure to a fuel control 28. The fuel control 28 determines the amount of fuel supplied to the distributor 40 through a supply conduit 42. The fuel control 28 may be operated in any conventional manner and here is shown as being operated by a manual lever 30. The distributor 40 in turn supplies fuel to a number of fuel nozzles 32 which are disposed in the upstream end of a number of combustion cans 34 which form a part of the combustion zone 18. The fuel nozzles 32 are of the dual entry, dual orifice type which have a first set of smaller openings 35 to supply fuel into the combustion cans 34 at lower flow rates and larger ports 37 to supply these combustion cans when the flow rates increase beyond a point at which the smaller points are no longer capable of handling the fuel supply. The smaller ports 35 and larger ports 37 in turn are individually supplied from separate manifolds 36 and 38, respectively. The ports in nozzle 32 are shown exaggerated in FIGURE 3 which also shows air passages 39 through which air flows from the diffuser 17 to the combustor cans 34 to aid in atomizing the fuel. The manifolds 36 and 38 are supplied from the distributor 40 which is a fuel distribution system that determines the flow either to manifold 36 through a primary subsystem comprising conduit 60 or to manifold 38 through a secondary subsystem comprising conduit 62 in accordance with the demands of the engine. Our invention is specifically related to the means for supplying the primary manifold or the secondary manifold, one form of which is shown schematically in greater detail in FIGURE 2.

FIGURE TWO CONFIGURATION

Referring to FIGURE 2, the conduit 42 which supplies fuel from the fuel control 28 is the inlet branch for a Y-branch type connector 44. The Y-branch connector has a pair of outlet conduits 46 and 48 which form a part of the primary and secondary systems, respectively. A filter 50 is disposed in the connector 44 between the inlet branch 42 and the primary or low flow branch 46 to filter the fuel flowing thereto from the fuel control 28. The filter 50 is also disposed in relation to the secondary or high flow branch 48 so as to be washed by fuel flowing from the inlet branch 42 to the secondary branch 48.

The primary conduit 46 and secondary conduit 48 both lead to a closed chamber 52 in which is slidably mounted a piston-type spool valve 54 having a central annular groove 56. A spring 58 is disposed in the closed chamber 52 between an end wall thereof and the piston valve 54 to bias it downwardly to a position where it blocks off the end of the secondary conduit 48. The primary conduit 46, however, communicates with the primary manifold supply conduit 60 through the annular groove 56. The conduit 60 in turn leads to the primary manifold 36. The secondary manifold 38 is fed from the conduit 62. The conduit 62, however, does not communicate with the conduit 48 since the end of conduit 48 has been blocked off by the valve 54. When the valve piston 54 is raised, however, communication will be established from 48 to 62. The spool valve piston 54 then is movable between an upward and a downward position. In the downward position, there is flow to the primary system through the annular groove 56 and the flow to the secondary system is blocked off at the end of conduit 48 by the lower face of valve 54. In the raised or upward position, fuel will flow past the lower face of valve 54 into conduit 62 of the secondary system, while flow in the primary system will be blocked off by the misalignment of groove 56 with conduits 46 and 60.

The low flow conduit 46 has a first branch 64 which communicates with the closed chamber 52 behind the piston spool valve 54 through a restriction 66. This same area of the closed chamber 52 behind the piston 54 in turn communicates with the high flow conduit 62 through fluid lines 68 and 70. A pilot valve 72 opens and closes a port 74 between the lines 68 and 70. The pilot valve 72 is mounted on a stem 76 which is attached to a bellows 78 disposed in a second closed chamber 80. The closed chamber 80 communicates with a total pressure pickup in the compressor 16 outlet through a conduit 82. The inside of the bellows is connected to a selecting chamber 86 through a conduit 88. The stem 76 carries a pair of spaced annular lands 90 and 92. When the pilot valve 72 closes the port 74 as is shown in FIGURE 2, the land 92 closes the selecting chamber 86 to atmospheric pressure through a vent conduit 94 while the land 90 opens the selecting chamber 86 to conduit 84. This conduit leads to a total pressure probe in the combustion space downstream of diffuser 17. The interior of bellows 78 is always in communication with the selecting chamber 86. Thus, when the valve 72 is in position shown in FIGURE 2, the outside of the bellows 78 is subjected to compressor discharge pressure and the inside of the bellows 78 is subjected to combustor inlet pressure. As the compressor discharge-combustor pressure differential increases to collapse the bellows 76 and move the pilot valve 72 and stem 76 downwardly to open the port 74, the pressure in chamber 86 and the inside of bellows 78 changes from compressor discharge to atmospheric when the lower land 90 blocks off conduit 84 and the inside of bellows 78 is vented to atmosphere through the conduit 88, chamber 86, and conduit 94.

The low flow conduit 46 has a second branch 96 which also leads to the conduit 62 at a point downstream of the distributing valve 54 through a closed chamber 98 and a conduit 100. The closed chamber 98 has a piston-type relief valve 102 biased in the closed direction by a spring 104. The conduit 100 has a branch 106 which leads to the chamber 98 behind the relief valve 102. While all lines and conduits are shown as having the same diameter, in actual practice, the primary lines and conduits are smaller then those of the secondary system.

FIGURE TWO OPERATION

The operation of the fuel system as shown in FIGURE 2 will now be described. Assume the engine 12 has been shut down and a starting cycle is required. The compressor discharge pressure and burner inlet pressure are essentially ambient and the various valves and parts are in the position as shown in FIGURE 2. The engine is started at a low fuel flow rate and the fuel is supplied from the fuel control conduit 42 to the combustor cans 34 through the primary system. More specifically, the fuel flows from conduit 42 to the Y-branch connector 44 where it flows radially outwardly through the filter 50 and into the low flow conduit 46, across the valve 54 via the groove 56 and into the conduit 60 where it is delivered to the manifold 36 and out the low or small flow ports 35 of the fuel nozzles 32. Note that the fuel has been filtered to remove any contaminants which might tend to clog the small flow ports 35. The branch conduits 64 and 96 are also filled as well as the conduit 68 which leads from the closed chamber 52 to the pilot valve 72. The high flow conduit 48 will be filled with fuel up to the point of the valve 54. Since the top surface of valve 54 which is subjected to primary fuel pressure is larger than the bottom surface which is subjected to inlet fuel pressure since spring 58 acts downwardly, valve 54 is retained in its downward position as shown in FIGURE 2. This is true even though the primary pressure is lower than the inlet pressure due to the slight losses through filter 50 and restriction 66. The spring 104 also biases valve 102 closed and consequently conduits 62, 70, 100, 106, and manifold 38 of the secondary system are empty.

When the fuel admitted to the burner cans 34 is ignited, the compressor discharge pressure (line 82) and combustor pressure (line 84) increase, as well as the difference between them. The difference between the pressures measures the total pressure drop across the diffusion zone 17 and combustor 34 or across the diffusion zone and regenerative zone is those installations which utilize a regenerator. The combustion gases then are expanded through the turbine zone 20 to drive the compressor. The pressure drop from the compressor discharge to the combustor indicates the air flow through the compressor which in turn is indicative of air pressure available to aid in fuel atomization. As the air flow is increased, the fuel flow is correspondingly increased by increasing the fuel pressure.

After the starting cycle has been completed and just prior to the requirement for the secondary system, the spring 104 will be overcome by the fuel pressure in line 96 and the valve 102 will open to admit primary fuel into the conduits 100, 106, 62, and 70, and manifold 38. Thus the secondary fuel system is now momentarily operating in a very limited manner with primary fuel. As the fuel pressure further increases, fuel flow to the combustor cans 34 increases, the combustion energy level increases and the pressure drop across the combustor inlet increases, that is, the difference between the compressor discharge pressure and the burner inlet pressure becomes greater.

When the pressure differential reaches a predetermined value indicative of a value which is incapable of atomizing fuel flow without the assistance of the primary ports 37, the bellows 78 collapse and the pilot valve 72 is moved downwardly. The downward movement of the pilot valve 72 opens port 74, emptying the fuel in the chamber 52 behind the spool valve 54 into the secondary conduit 62 through the conduit 70. Because the port 74 is larger than the restriction 66, the fuel will leave the chamber 54 faster than more fuel can be supplied from the branch conduit 54. This will decrease the pressure behind the spool valve 54 and it will be moved upwardly by the pressure of the fuel in the secondary conduit 48. As the spool valve 54 moves upwardly, more area becomes subjected to secondary fuel pressure and it will move to its uppermost position where it blocks the flow from the conduit 46 to the conduit 60 of the primary system. The combustor cans 34 are now being fed totally by the secondary system; the main supply of fuel being by way of conduits 48 and 62 past valve 54. This fuel is unfiltered and may actually be somewhat more contaminated than usual at first, since it washes the filter 50 as it flows past it from the fuel supply conduit 42. The larger fuel nozzle ports 37 of the secondary system, however, are capable of handling the contaminants. There is also some filtered flow to the secondary manifold 38 comprising bleed flow past the pilot valve 72 and the secondary fuel valve 102.

When this transition to the secondary system has occurred, the pilot valve 72 will have moved the lands 90 and 92 to a position where the inside of bellows 78 is vented to atmospheric pressure. Since the combustor inlet pressure is higher than ambient pressure, the pilot valve 72 is now held open with a greater force and a subsequent small decrease in burner or combustor inlet pressure will not close the pilot valve 72. The reason for changing the pressure drop signal for the pilot valve 72 is that the burner inlet-compressor discharge pressure drop decreases with increasing altitude. For instance, in a typical engine, a pressure drop of only 1 p.s.i. would be experienced at 30,000 ft. at 75% speed. Thus, to insure against the pilot valve signal becoming too weak to maintain the valve open at altitude, the signal is changed after transition. In other words, the starting cycle is completed under sea level or relatively low altitude conditions and the fuel delivery is then switched to the secondary system responsive to the diffuser pressure drop. If this signal were kept, at some altitude, the pressure drop would not maintain the bellows collapsed and the system would revert to primary flow even though a large flow was required. To circumvent this problem, the pilot pressure signal is changed after transition.

Once having started and switched to the secondary system, the engine would not again require the primary system except for another start in which case the above sequence of events would be repeated. Since the system then would never have to revert during operation, the fact that the pilot valve is held open with a substantially large force after transition is of no consequence.

Another advantage with the pilot valve 72 being responsive to the compressor discharge-ambient pressure differential after transition, is that it is assured that the system will not revert back to the primary system if fuel flow is reduced a small amount so that there will be no "hunting" should the engine be operating near the transition point.

FIGURE THREE CONFIGURATION

The fuel system which is shown in FIGURE 3 is essentially the same as that shown in FIGURE 2 and like parts have been designated by adding 100 to the corresponding parts of FIGURE 2. The following modifications or changes from the FIGURE 2 configuration are to be noted. The pressure relief valve 202 has been placed entirely in the secondary fuel system; therefore, the second branch conduit 96 of the primary conduit 46 in FIGURE 2 which leads to the pressure relief valve 102 has been eliminated. In its place a conduit 250 has been provided which extends from the Y-branch connector 144 to the chamber 198 which is closed from the fuel source thus provided by the pressure relief valve 202.

The second noticeable modification is in the actuation of the bellows 178. In the FIGURE 3 configuration, the conduit 184 leads directly to the inside of bellows 178. The intermediate modulating chamber 86, conduit 88, and vent 94 of FIGURE 2 have been eliminated. In addition, the chamber 180 outside of the bellows 178 is connected by a conduit 252 to conduits 200 and 162 of the secondary fuel system rather than to the compressor discharge area 16. With the above modifications in mind, the operation of FIGURE 3 will now be described.

FIGURE THREE OPERATION

As the engine is started and fuel flow is low, the various parts will be in the position shown in FIGURE 3 and the fuel flow will be through the primary system. More specifically, the fuel will flow from source 142 through the filter 150 into the conduit 146, across the valve 154 via the groove 156 and into the conduit 160 where it is delivered to the primary manifold 36 and out the small flow ports 35. The conduits 164 and 168 and the chamber 152 which is between them and behind the valve 154 will also be filled with filtered primary fuel. Note that at this time, none of the conduits of the secondary fuel system are filled beyond the points of the distributing valve 154 and the pressure relief valve 202. Therefore, the conduits 162, 170, and 252 are empty of fuel and are essentially at burner inlet pressure since the conduits are connected with the inside of the burner through the nozzle ports 37. The bellows 178 then is subjected to the same burner or combustor inlet pressure on the inside and the outside. Since there is no pressure differential in the bellows 178, it will not respond to increasing combustor inlet pressure. The port 174 is kept closed by the spring force of the metallic bellows 178 acting on valve 172.

As the engine is accelerated and the fuel pressure is increased to increase the fuel flow, the spring 204 is overcome and pressure relief valve 202 is opened, allowing the flow of unfiltered fuel into the secondary system to fill conduits 162, 170, 200, 206, 252, and chamber 180. With the opening of valve 202, the following has taken place in the system: the secondary conduits all have been filled, a limited amount of fuel is being delivered to the secondary ports 37, and the chamber 180 has been filled with secondary fuel so that the outside of bellows 178 is subjected to fuel pressure and it is now responsive to the fuel pressure-combustor pressure differential. It is this latter feature which is the essential difference between the FIGURE 2 and FIGURE 3 configurations. In the FIGURE 2 configuration, the compressor discharge-combustor pressure differential is utilized to signal requirements for the secondary system, whereas in the FIGURE 3 configuration, the fuel pressure-combustor pressure differential is utilized as the signal.

As the fuel flow and fuel pressure-combustor pressure differential further increases to a point where secondary flow is sufficient to give good atomization in conjunction with the air pressure available without the assistance of the primary system, the pressure difference between burner inlet and fuel will be great enough to cause pilot valve 172 to move downwardly to open port 174. With port 174 open, the fuel in the chamber 152 flows out conduit 168 past port 174 into conduit 170 and conduit 162 of the secondary fuel system. Because the port 174 is larger than the restriction 166, the chamber 152 will empty and the pressure therein will diminish allowing the valve 154 to be opened by the fuel pressure in conduit 148. The opening of the valve 154 blocks off primary fuel flow from conduit 146 to conduit 160 while allowing the fuel flow from secondary supply conduit 148 into conduit 162 of the secondary fuel system. Thus, the transition has been made from the primary into the secondary system. Once the transition has occurred after the starting cycle has been completed, the engine should not revert to the primary system except when a starting cycle is again required. Note another difference in the FIGURE 2 configuration is that the pilot valve signal is not changed. The fuel pressure-combustor inlet pressure differential is a stronger signal and is not as effected by altitude as the compressor-discharge-combustor inlet pressure differential so a signal change is not required for altitude considerations.

While in the discussion of the first embodiment of our invention, repeated reference was made to the combustor pressure drop, that is, the compressor discharge-combustor pressure differential, as the pilot valve signal, the first embodiment is obviously also applicable to gas turbine engines having a regenerator. In such a case, the initial pilot valve signal would include the regenerator pressure drop.

It will also be apparent that many modifications of structure may be made to both embodiments of our invention by the exercise of skill in the art without departing from the principles of our invention as defined in the appended claims.

We claim:

1. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising, in combination:

an inlet conduit,
   a high flow conduit,
   a low flow conduit,
   Y-branch means connecting said conduits,
   spool valve means in said high and low flow conduits movable between a first position where said low flow conduit is open and said high flow conduit is closed and a second position where said low conduit is closed and said high flow conduit is open,
   fuel pressure responsive motor means to move said spool valve means between said first and second positions,
   pilot valve means to control said fuel pressure motor means, and
   fluid motor means to operate said pilot valve means, said fluid motor means being responsive to a signal indicative of fuel flow requirements whereby said spool valve means opens either said high or said low flow conduits to flow fuel in response to demands of the engine.

2. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising, in combination:

an inlet conduit,
a low flow conduit,
a high flow conduit,
Y-branch means connecting said conduits,
filter means in said Y-branch means between said inlet and low flow branches and adjacent said high flow branch so as to filter the fuel flowing to said low flow branch and to be washed by the fuel flowing to said high flow branch,
spool valve means in said high and low flow conduits movable between a first position where said low flow conduit is open and said high flow conduit is closed and a second position where said low conduit is closed and said high flow conduit is open,
fuel pressure responsive motor means to move said spool valve means between said first and second positions,
pilot valve means to control said fuel pressure motor means, and
fluid motor means to operate said pilot valve means, said fluid motor means being responsive to the compressor discharge-combustor pressure drop which is indicative of air pressure available for atomization whereby said spool valve means opens either said high or said low flow conduits to flow fuel in response to air pressure available.

3. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising, in combination:

an inlet conduit,
a low flow conduit,
a high flow conduit,
Y-branch means connecting said conduits,
filter means in said Y-branch means between said inlet and low flow branches and adjacent said high flow branch so as to filter the fuel flowing to said low flow branch and to be washed by the fuel flowing to said high flow branch,
spool valve means in said high and low flow conduits movable between a first position where said low flow conduit is open and said high flow conduit is closed and a second position where said low conduit is closed and said high flow conduit is open,
fuel pressure responsive motor means to move said spool valve means between said first and second positions,
fuel pressure responsive by-pass means connecting said low flow conduit means to said high flow conduit means downstream of said spool valve means adapted to fill said high flow conduit downstream of said spool valve means just prior to said spool valve means being moved to said second position,
pilot valve means to control said fuel pressure motor means, and
fluid motor means to operate said pilot valve means, said fluid motor means being responsive to the compressor discharge-combustor pressure drop which is indicative of air pressure available for atomization whereby said spool valve means opens either said high or said low flow conduits to flow fuel in response to air pressure available.

4. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising, in combination:

an inlet conduit,
a high flow conduit,
a low flow conduit,
Y-branch means connecting said conduits,
spool valve means in said high and low flow conduits movable between a first position where said low flow conduit is open and said high flow conduit is closed and said high flow conduit is open,
fuel pressure responsive motor means to move said spool valve means between said first and second positions,
pilot valve means to control said fuel pressure motor means, and
fluid motor means to operate said pilot valve means, said fluid motor means being responsive to the difference between the pressure at the compressor discharge and a pressure modulated between the pressure at the combustor and ambient which is indicative of air pressure available for atomization whereby said spool valve means opens either said high or said low flow conduits to flow fuel in response to air pressure available.

5. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising in combination:

an inlet conduit,
a high flow conduit,
a low flow conduit,
Y-branch means connecting said conduits,
filter means in said Y-branch means between said inlet and low flow branches and adjacent said high flow branch so as to filter the fuel flowing to said low flow branch and to be washed by the fuel flowing to said high flow branch,
spool valve means in said high and low flow conduits movable between a first position where said low flow conduit is open and said high flow conduit is closed and a second position where said low conduit is closed and said high flow conduit is open,
motor means to move said spool valve means between said first and second positions, and
pilot means to control said motor means, said pilot means being responsive to the compressor discharge-combustor pressure differential which is indicative of air pressure available for atomization whereby said spool valve means opens either said high or said low flow conduits to flow fuel in response to air pressure available.

6. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising, in combination:

an inlet conduit,
a high flow conduit,
a low flow conduit,
Y-branch means connecting said conduits,
spool valve means in said high and low flow conduits movable between a first position where said low flow conduit is open and said high flow conduit is closed and a second position where said low conduit is closed and said high flow conduit is open, and
motor means to move said spool valve means between said first and second positions, said motor means being responsive to the compressor discharge-combustor pressure differential which is indicative of air pressure available for atomization whereby said spool valve means opens either said high or said low flow conduits to flow fuel in response to air pressure available.

7. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising, in combination:
- an inlet conduit,
- a low flow conduit,
- a high flow conduit,
- Y-branch means connecting said conduits,
- filter means in said Y-branch means between said inlet and low flow branches and adjacent said high flow branch so as to filter the fuel flowing to said low flow branch and to be washed by the fuel flowing to said high flow branch,
- spool valve means in said high and low flow conduits movable between a first position where said low flow conduit is open and said high flow conduit is closed and a second position where said low conduit is closed and said high flow conduit is open,
- fuel pressure responsive motor means to move said spool valve means between said first and second positions,
- pilot valve means to control said fuel pressure motor means, and
- fluid motor means to operate said pilot valve means, said motor means being responsive to the fuel pressure-combustor inlet pressure differential which is indicative of fuel pressure level which is capable of giving required atomization whereby said spool valve means opens either said high or said low flow conduits to flow fuel in response to demands of the engine.

8. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising, in combination:
- an inlet conduit,
- a low flow conduit,
- a high flow conduit,
- Y-branch means connecting said conduits,
- filter means in said Y-branch means between said inlet and low flow branches and adjacent said high flow branch so as to filter the fuel flowing to said low flow branch and to be washed by the fuel flowing to said high flow branch,
- spool valve means in said high and low flow conduits movable between a first position where said low flow conduit is open and said high flow conduit is closed and a second position where said low conduit is closed and said high flow conduit is open,
- fuel pressure responsive motor means to move said spool valve means between said first and second positions,
- fuel pressure responsive by-pass means in said high flow conduit across said spool valve means adapted to fill said high flow conduit downstream of said spool valve means just prior to said spool valve means being moved to said second position,
- pilot valve means to control said fuel pressure motor means, and
- fluid motor means to operate said pilot valve means, said motor means being responsive to the fuel pressure-combustor inlet pressure differential which is indicative of fuel pressure level which is capable of giving required atomization whereby said spool valve means opens either said high or said low flow conduits to flow fuel in response to demands of the engine.

9. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising, in combination:
- an inlet conduit,
- a high flow conduit,
- a low flow conduit,
- Y-branch means connecting said conduits,
- spool valve means in said high and low flow conduits movable between a first position where said low flow conduit is open and said high flow conduit is closed and a second position where said low conduit is closed and said high flow conduit is open,
- motor means to move said spool valve means between said first and second positions, and
- pilot means to control said motor means in response to the fuel pressure-combustor inlet pressure differential which is indicative of fuel pressure level which is capable of giving required atomization whereby said spool valve means opens either said high or said low flow conduits to flow fuel in response to demands of the engine.

10. In a variable flow rate fuel system for an internal combustion engine having a compressor and a combustor in which primary and secondary subsystems are provided for lower and higher flows, respectively, means for distributing the fuel supply between the subsystems in relation to the demands of the engine comprising, in combination:
- an inlet conduit,
- a high flow conduit,
- a low flow conduit,
- Y-branch means connecting said conduits,
- filter means in said Y-branch means between said inlet and low flow branches and adjacent said high flow branch so as to filter the fuel flowing to said low flow branch and to be washed by the fuel flowing to said high flow branch,
- spool valve means in said high and low flow conduits movable between a first position where said low flow conduit is open and said high flow conduit is closed and a second position where said low conduit is closed and said high flow conduit is open, and
- motor means to move said spool valve means between said first and second positions, said motor means being responsive to the fuel pressure-combustor inlet pressure differential which is indicative of fuel pressure level which is capable of giving required atomization whereby said spool valve means opens either said high or said low flow conduits to flow fuel in response to demands of the engine.

References Cited by the Examiner
UNITED STATES PATENTS

| | | | |
|---|---|---|---|
| 2,667,742 | 2/1954 | Kuzmitz | 60—39.14 |
| 2,780,915 | 2/1957 | Karen | 60—39.82 |
| 2,928,240 | 3/1960 | Burton et al. | 60—39.14 |
| 2,963,082 | 12/1960 | Binford et al. | 158—36 |

JULIUS E. WEST, *Primary Examiner*.

UNITED STATES PATENT OFFICE
CERTIFICATE OF CORRECTION

Patent No. 3,319,418                 May 16, 1967

Leland W. Bryant et al.

It is hereby certified that error appears in the above numbered patent requiring correction and that the said Letters Patent should read as corrected below.

Column 3, line 72, for "is" read -- in --; column 8, line 9, after "closed" insert -- and a second position where said low conduit is closed --.

Signed and sealed this 14th day of November 1967.

(SEAL)
Attest:

Edward M. Fletcher, Jr.
Attesting Officer

EDWARD J. BRENNER
Commissioner of Patents